United States Patent
Roytman et al.

(10) Patent No.: US 12,505,125 B1
(45) Date of Patent: Dec. 23, 2025

(54) SYSTEM AND METHOD FOR CONVERSION OF MULTI-PARENT REPRESENTATION OF RELATIONSHIP TO MULTI-HIERARCHY ONE IN MULTI-DIMENSIONAL ANALYTICAL DATABASES

(71) Applicant: Oracle International Corporation, Redwood Shores, CA (US)

(72) Inventors: Alexey Roytman, Beer-Sheva (IL); Alexander Brun, Beer Sheba (IL); Ilya Tebelev, Beer Sheva (IL); Natasha Reichman, Beer Sheva (IL); Sergei Riaboi, Arad (IL)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/750,981

(22) Filed: Jun. 21, 2024

(51) Int. Cl.
G06F 16/28 (2019.01)

(52) U.S. Cl.
CPC .................. G06F 16/284 (2019.01)

(58) Field of Classification Search
CPC ....................................... G06F 16/284
USPC ..................................................... 707/736
See application file for complete search history.

(56) References Cited

U.S. PATENT DOCUMENTS

| | | | |
|---|---|---|---|
| 6,477,536 B1 | 11/2002 | Pasumansky et al. | |
| 6,980,980 B1 * | 12/2005 | Yeh | G06F 16/283 |
| 7,546,226 B1 | 6/2009 | Yeh et al. | |
| 8,510,261 B1 | 8/2013 | Samantray | |
| 9,146,955 B2 | 9/2015 | Nos et al. | |
| 9,519,701 B2 | 12/2016 | Amule et al. | |
| 9,619,581 B2 | 4/2017 | Hughes et al. | |
| 10,740,333 B1 | 8/2020 | Betawadkar-Norwood et al. | |
| 11,593,402 B2 | 2/2023 | Ramaiyer | |
| 2001/0013030 A1 | 8/2001 | Colby et al. | |
| 2004/0122844 A1 | 6/2004 | Malloy et al. | |
| 2004/0139061 A1 | 7/2004 | Colossi et al. | |

(Continued)

OTHER PUBLICATIONS

Live SQL, "Creating Analytic Views—Getting Started", dated Jan. 4, 2017, 22 pages.

(Continued)

Primary Examiner — Kuen S Lu
(74) Attorney, Agent, or Firm — Hickman Becker Bingham Ledesma LLP

(57) ABSTRACT

Here is database integration in which a relational table and an analytic view are generated and configured in a relational database for acceleration and optimally populated from summarization hierarchies derived from a dimension in a multidimensional database. This approach is a new way to transfer online analytical processing (OLAP) metadata from a multidimensional database to a relational database. Shared members may cause this approach to generate a directed acyclic graph (DAG) that organizes the metadata. The OLAP content generated in the relational database has a novel data topology that is unconventional because relational data normalization strategies such as third normal form (3NF) are avoided. This novel data topology achieves unprecedented data locality of metadata in a relational database. Due to optimization techniques such as graph coloring for detection and resolution of conflicts caused by shared members, the accuracy and speed of the data integration between the two databases is increased.

20 Claims, 5 Drawing Sheets

(56) References Cited

U.S. PATENT DOCUMENTS

| | | | |
|---|---|---|---|
| 2004/0215626 A1* | 10/2004 | Colossi | G06F 16/22 |
| 2011/0258167 A1* | 10/2011 | Binstock | G06Q 40/02 |
| | | | 707/804 |
| 2014/0181154 A1 | 6/2014 | Amulu et al. | |
| 2019/0272492 A1* | 9/2019 | Elledge | G06Q 10/0637 |
| 2020/0050483 A1* | 2/2020 | Shear | G06F 9/5072 |
| 2022/0092069 A1 | 3/2022 | Hartsing et al. | |
| 2022/0147527 A1 | 5/2022 | Hartsing et al. | |

OTHER PUBLICATIONS

Fu et al., "CubiST: A New Algorithm for Improving the Performance of Ad-hoc OLAP Queries", dated 2000, 8 pages.

"Metadata Modeling in the Database with Analytic Views", Oracle Database, analytic views, metadata, obiee, DVD, database, analytic view, self-service reporting, Apr. 3, 2017, 15 pages.

\* cited by examiner

SYSTEM AND METHOD FOR CONVERSION OF MULTI-PARENT REPRESENTATION OF RELATIONSHIP TO MULTI-HIERARCHY ONE IN MULTI-DIMENSIONAL ANALYTICAL DATABASES

FIELD OF THE DISCLOSURE

This disclosure relates to database integration. A relational table and an analytic view are generated and configured in a relational database for query acceleration and optimally populated from summarization hierarchies derived from a dimension in a multidimensional database.

BACKGROUND

Online analytical processing (OLAP) includes the following aggregation activities. Content in an OLAP database may be treated as a hypercube (i.e. multidimensional cube, OLAP cube) that contains values. An OLAP cube consist of multiple distinct dimensions, and each dimension is associated with many values. To define an OLAP cube, multiple dimensions can be individually: a) sliced (i.e. included, excluded, and range limited) and b) diced at various granularities to facilitate aggregation activities such as consolidation (i.e. rollup summarization and aggregation) and drill-down (i.e. zooming in to expose details hidden in a consolidated portion of the cube).

A dimension may have multiple distinct granularities (i.e. levels). For example, a time dimension may contain a month level that contains distinct months and a calendar quarter level that contains distinct quarters. Some or all values in a lower level may aggregate (i.e. rollup) into a value in a higher level. For example, respective revenues of multiple months may rollup into revenue of a calendar quarter by summation.

A technical challenge is that multidimensional OLAP is not directly supported by relational algebra nor by structured query language (SQL), even though relational algebra and SQL both support star and snowflake schemas that often occur with multidimensional OLAP. This challenge is partly due to discrepant normalization (i.e. arrangement) of data in a, for example five dimensional, OLAP cube versus in a set of five joined relations (i.e. relational tables in a relational database). This discrepancy may partially be because a relational schema is designed for so-called third normal form (3NF). Tabular normalization forms such as 1NF, 2NF, and 3NF are designed to eliminate redundancy and improve data integrity. An OLAP cube is instead designed for sparsity and mathematical aggregation activities such as summation and statistics.

Multidimensional and relational architectures are two discrepant data arrangement strategies that may impose a compatibility barrier that prevents data exchange between databases of different architectures. One approach is to copy data from one database of one architecture to another database of another architecture. However, copying may be impacted by technical problems such as latency, spurious duplication of data, and wasted unused space surrounding sparse data. Thus, the result of naïve copying may be data loss (i.e. an inaccurate copy), spatial infeasibility (i.e. insufficient space), or temporal infeasibility (i.e. too much latency) while copying or later when querying the copy.

As discussed later herein, a dimension might not be strictly structured as levels in exactly one tree. The data topology of a dimension may be, during naïve copying, more or less technically problematic and may cause a malfunction such as data loss, data corruption, or a crash. Thus, state of the art data migration from one data architecture to another may entail a best case of wasted computer resources and a worst case of unreliability (i.e. failure).

DETAILED DESCRIPTION

Figure 1A:
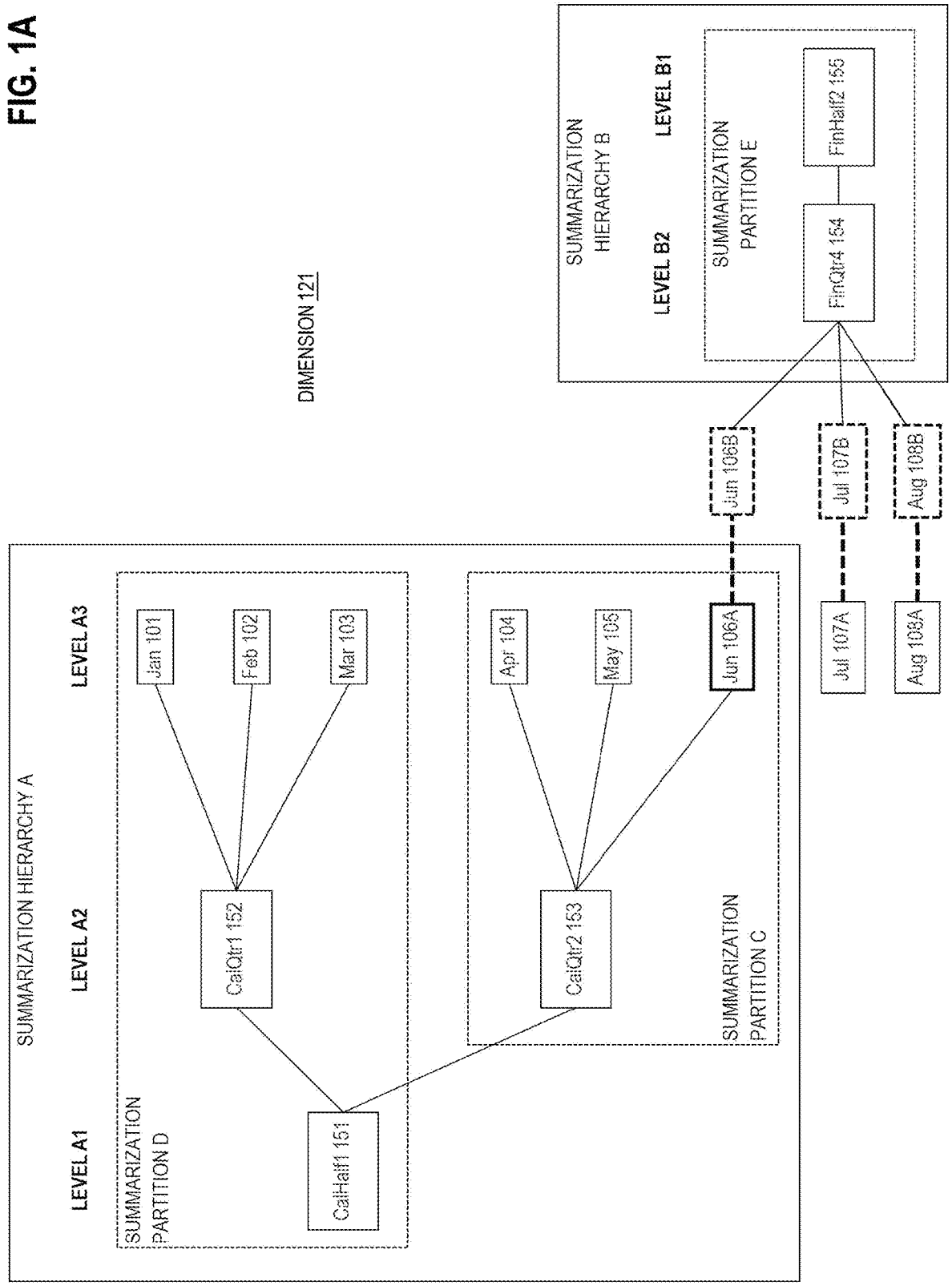
FIG. 1A is a block diagram that depicts example data structures generated by analyzing a dimension in a multidimensional database.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Here is database integration in which a relational table and an analytic view are generated and configured in a relational database for acceleration and optimally populated from summarization hierarchies derived from a dimension in a multidimensional database. As discussed later herein, a summarization hierarchy may be generated based on a sequence of multiple levels (i.e. data granularities) in a dimension. For example in a time dimension, days may be one level, months may be another level, and years may be yet another level. A multidimensional database can readily store values in one level and mathematically aggregate those values to synthesize new values in another level. For example, aggregation may entail generating, by summation, a subtotal or a total from multiple subtotals. Herein, aggregation may be referred to as rollup.

The data integration approach described herein is a new way to transfer online analytical processing (OLAP) metadata from a multidimensional database to a relational database. As discussed later herein, a dimension cannot be strictly structured as levels in exactly one tree. For example as discussed later herein, a so-called shared member may cause a same value to rollup to multiple parent members, which this approach handles by generating a data topology that is a directed acyclic graph (DAG). As discussed later herein, a shared member is a way to reuse one rollup in multiple other, more comprehensive rollups. The approach herein entails generation and analysis of a DAG from metadata in a multidimensional database such as Oracle Essbase.

Conditions and patterns detected by analysis herein cause optimal generation and population of a corresponding database table and an analytic view. An analytic view is a special database view, and the generated database table and analytic view can, for example, be part of an implementation a complete OLAP cube in the relational database that is logically identical to an original cube in the multidimensional database. Herein, a relational database may contain two distinct kinds of database views that are a relational view as defined in standard structured query language (SQL) and an analytic view that may be a non-standard (e.g. proprietary) extension to SQL for OLAP. This approach does not involve a relational view.

As discussed later herein, OLAP artifacts such as dimensions, levels, facts, and measures, and OLAP activities such as rolling up and drilling down may have semantics in one or both of the multidimensional database and the relational database. The OLAP content generated herein in the relational database may be operated in a way that is logically equivalent to OLAP operation in the multidimensional database. The OLAP content in the relational database has a novel data topology that achieves unprecedented data locality of metadata in a relational database. Due to optimization techniques such as graph coloring for detection and resolution of conflicts caused by shared members, the accuracy and speed of the data integration between the two databases is increased over the state of the art. In other words, this approach is a faster, more reliable, and more accurate way to transfer complicated OLAP metadata from a multidimensional database to a relational database, and the OLAP content in the relational database has optimal performance characteristics when later used for multidimensional analytics.

1.0 Example Dimension and Computer

Figure 1B:
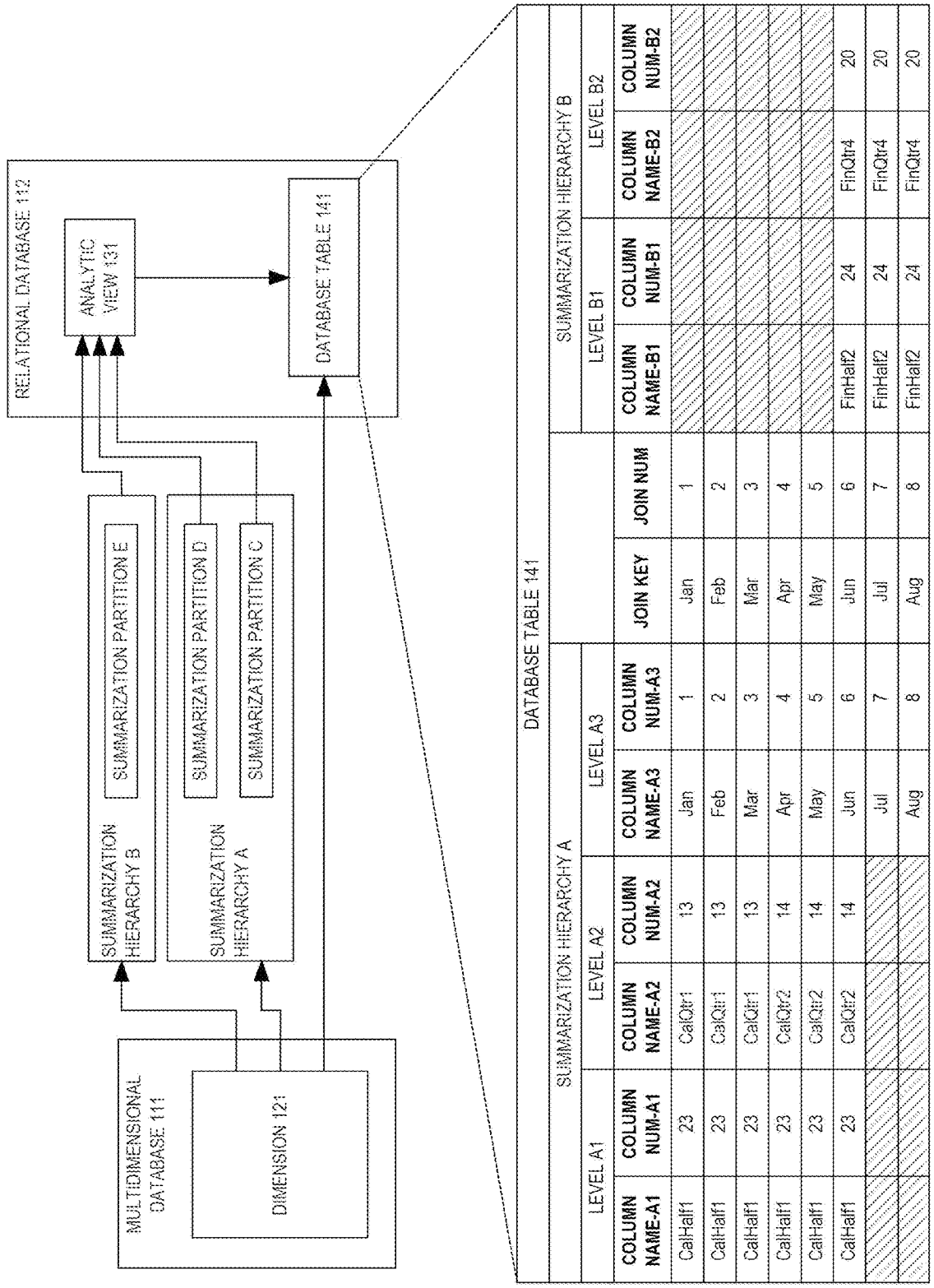
FIG. 1B is a block diagram that depicts an example database integration computer that generates a database table and an analytic view that are configured in a relational database for acceleration and optimally populated from summarization hierarchies derived from a dimension in a multidimensional database.

FIGS. 1A-B are complimentary block diagrams that show various components in or accessible to computer 100. Computer 100 is shown in FIG. 1B that is discussed later herein. For case of demonstration, all components shown in FIGS. 1A-B are discussed as being contained in computer 100 as a consolidated embodiment. In distributed embodiments discussed later herein, computer 100 is multiple computers, and different subsets of the components shown in FIGS. 1A-B are contained in different respective computers. Computer 100 may be one or more instances of a rack server such as a blade, a mainframe, a virtual machine, or other computing device.

FIG. 1A depicts example dimension 121 whose members 101-105, 106A-B, 107A-B, 108A-B, and 151-155 are components of dimension 121 and stored in multidimensional database 111 that is shown in FIG. 1B. Dimension 121 represents a category or hierarchy used to organize data. A member may be a distinct value within a dimension. Computer 100 retrieves members 101-105, 106A-B, 107A-B, 108A-B, and 151-155 and discovers and analyzes associations between those members. By this analysis, those members are organized into various sets that computer 100 may represent by generating organizational data structures A, A1-A3, B, B1-B2, and C-E that may each comprise, for example, an array or a logical tree. Organizational data structures A, A1-A3, B, B1-B2, and C-E are generated by computer 100 to represent the inferred structure of dimension 121, but multidimensional database 111 does not store organizational data structures A, A1-A3, B, B1-B2, and C-E. For example, multidimensional database 111 may be immutable (i.e. read-only), which does not prevent data structure generation herein.

Organizational data structures A, A1-A3, B, B1-B2, and C-E are an innovative way to migrate or otherwise integrate dimension 121 and its members 101-105, 106A-B, 107A-B, 108A-B, and 151-155 from multidimensional database 111 into relational database 112 that is shown in FIG. 1B. Herein for dimension 121, integration and migration may be synonyms if migration does not require that content in multidimensional database 111 be deleted or become disused. For example after integration, dimension 121 may concurrently be fully operational in both databases 111-112. Databases 111-112 may be variously stored in volatile and/or nonvolatile storage of computer 100. In an embodiment, databases 111-112 are respectively contained in a first computer and a second computer, and organizational data structures A, A1-A3, B, B1-B2, and C-E are generated in a third computer.

1.1 Online Analytical Processing (OLAP)

In respective distinct ways as discussed later herein, databases 111-112 provide online analytical processing (OLAP), including the following aggregation activities. Some OLAP content in either of databases 111-112 may, in some examples, be treated as a hypercube (i.e. multidimensional cube, OLAP cube) that contains values. An OLAP cube consists of multiple distinct dimensions, and each dimension consists of multiple distinct values. To define an OLAP cube, multiple dimensions can be individually: a) sliced (i.e. included, excluded, and range limited) and b) diced at various granularities to facilitate aggregation activities such as consolidation (i.e. rollup summarization and aggregation) and drill-down (i.e. zooming in to expose details hidden in a consolidated portion of the cube). In multidimensional database 111, content can be natively presented in multidimensional OLAP cubes. For example, an OLAP cube may contain data associated with dimension 121.

1.2 Arranging Members into Summarization Hierarchies

Herein, summarization hierarchies A-B may be respectively referred to as a first summarization hierarchy and a second summarization hierarchy. Each of summarization hierarchies A-B is a multilevel tree-like aggregation that defines, for example, rollup summarization of members from a deeper tree level. For example as shown, summarization hierarchy A contains a sequence of levels A1-A3, where level A1 is the root level, level A2 is an intermediate level, and level A3 is a leaf (i.e. deepest) level. Likewise, summarization hierarchy B contains a sequence of levels B1-B2.

A summarization hierarchy has multiple distinct data granularities (i.e. levels). For example, dimension 121 may be time and, in summarization hierarchy A, level A3 may contain distinct months and level A2 may contain distinct calendar quarters. A unit of metadata in a level is referred to herein as a member. All members in a summarization hierarchy are distinct.

Some or all members in a deeper (i.e. child) level may aggregate (i.e. rollup) into a member in a parent level. For example, month members 101-103 in level A3 may aggregate into member calendar quarter one (CalQtr1) 152 in level A2. Thus, member CalQtr1 is referred to herein as an aggregative parent member. Month members 103-104 rollup into distinct respective aggregative parent members 152-153. In the shown example, month members 107A and 108A do not rollup into an aggregative parent member, either by design or because generation of summarization hierarchy A by computer 100 is still ongoing as discussed later herein.

1.3 Member Rollup into Multiple Summarization Hierarchies

Each of members 101-105, 106A-B, 107A-B, 108A-B, and 151-155 is respectively contained in exactly zero or one of summarization hierarchies A-B. Although summarization hierarchies A-B should not both contain a same member, members 106B, 107B, and 108B are special members in multidimensional database 111 that are referred to herein as shared members. Each of shared members 106B, 107B, and 108B is a placeholder that represents a respective other member that is referred to herein as a prototype member. The shown bold dashed horizontal lines respectively connect shared members 106B, 107B, and 108B to respective prototype members 106A, 107A, and 108A.

Prototype member 106A is in summarization hierarchy A. Although shared members 106B, 107B, and 108B are not in any summarization hierarchy, shared members 106B, 107B, and 108B rollup into aggregative parent financial quarter four (FinQtr4) 154. During analysis, computer 100 makes various detections discussed later herein including: a) shared member Jun 106B refers to prototype member Jun 106A, and b) members Jun 106A-B rollup to distinct respective aggregative parent members 153-154 in distinct respective summarization hierarchies A-B. Based on those detections (a)-(b), computer 100 infers a conflict that, as discussed later herein, should be resolved by treating members 151 and 153 as respective roots of distinct trees shown as summarization partitions C-D.

In that case, there is no conflict between summarization partitions D-E because there is no pairing of a shared member with its prototype member in which both members are contained in the union of summarization partitions D-E. Discussed later herein is an analytic view that computer 100 may generate based on summarization hierarchies A-B and summarization partitions C-D.

1.4 Directed Acyclic Graph (DAG)

In the shown example, summarization partitions C and E are two logical trees that are effectively connected by shared members 106B, 107B, and 108B. In that way, computer 100 may generate a directed acyclic graph (DAG).

1.5 Multiple Levels in Summarization Hierarchy

Two summarization hierarchies may contain a same or different count of levels. In an embodiment, there is: a) no maximum count of summarization hierarchies that a dimension may contain, b) no maximum count of levels that a summarization hierarchy may contain, and c) no maximum count of members that a level may contain. In an embodiment, each summarization hierarchy has a sequence of multiple levels, and each level contains at least one member.

1.6 Multidimensional Database and Relational Database

FIG. 1B depicts databases 111-112 and summarization hierarchies A-B in computer 100. In an embodiment, multidimensional database 111 is an Oracle Essbase database. Techniques for configuring and operating members, levels, dimensions, and multidimensional databases are presented in U.S. Pat. No. 11,593,402 "System and method for enabling multiple parents with weights in a multidimensional database environment" by Kumar Ramaiyer on Jun. 29, 2018 that is incorporated herein in its entirety. Although taught in that patent, weights are not used herein.

Multidimensional database 111 is not a relational database and does not contain relational tables nor other database tables. Although relational database 112 is not a multidimensional database, relational database 112 can contain analytic views. An analytic view is a special kind of database view that can be used by OLAP as discussed earlier herein. An analytic view may be materialized (i.e. caching, stateful) or unmaterialized (i.e. stateless). Reading an unmaterialized view always requires reading a base table. A materialized view is accelerated because it avoids repeatedly reading the base table.

1.7 Relational Table Generated

Computer 100 generates a distinct exactly one database table 141 in relational database 112 for a distinct exactly one dimension 121 from multidimensional database 111. Herein, all summarization hierarchies A-B and all summarization partitions C-E for dimension 121 have their members stored into the exactly one database table 141. Database table 141 is demonstratively (i.e. not actually duplicated) shown twice in FIG. 1B, once in relational database 112 in the upper right of FIG. 1B and once by itself to show its contents at the bottom of FIG. 1B.

1.8 Novel Relational Topology for Multidimensional Data

In database table 141 are content rows shown below demonstrative (i.e. not stored) rows. In database table 141 is a demonstrative row shown bold that contains identifiers of table columns that says, for example, Join Key and Join Num. That bold row and all rows above it are demonstrative and not stored in database table 141 but are shown to reveal structure and organization that is implied for database table 141. All rows shown below the bold row are metadata that are contents actually stored in database table 141.

In the shown embodiment, database table 141 contains two distinct columns for each distinct pairing of summarization hierarchy and level. For example as shown, database table 141 contains columns name-A1 and num-A1 for level A1 in summarization hierarchy A. As shown in database table 141, columns whose identifiers begin with the prefix "column name-" actually contain respective names (i.e. original identifiers) of non-shared members such as CalQtr1 and Aug. In various embodiments, member names are integers or, in the shown embodiment, text strings. Herein, non-shared member names are: unique within dimension 121, unique within summarization hierarchy A, unique withing summarization partition D, and unique within level A1.

1.9 Novel Storage of Multilevel Dimension

As shown in database table 141, columns whose identifiers begin with the prefix "column num-" contain respective ordinal integers of members. An ordinal integer may, for example, be a zero or one based serial number. In this example, column num-A3 contains unique ordinal integers of leaf members. Column num-A2 instead contains repeated (i.e. non-unique) ordinal integers because members 152-153 are not leaf members.

Ordinal integer columns are optional and, if implemented, provide accelerated access to members. In a first accelerated example based on column num-A3, a numeric ordinal range of 1-8 (i.e. two numbers, 1 and 8) provides accelerated access to eight month members without having to specify individual ordinal integers 1, 2, 3, 4, 5, 6, 7, and 8. In a second accelerated example based on column num-A2, ordinal integer 13 (i.e. one number) provides accelerated access to three month members January, February, and March without having to specify individual ordinal integers 1, 2, and 3. For example, an ordinal integer column may have a non-unique database column index for acceleration.

As shown in FIG. 1A, summarization partition C does not include level A1. As shown in FIG. 1B, analytic view 131 represents summarization hierarchies A-B that includes all levels A1-A3 and B1-B2 as shown in FIG. 1A. Analytic view 131 can use all of columns name-A1, name-A2, name-A3, name-B1, name-B2, num-A1, num-A2, num-A3, num-B1, and num-B2 as discussed later for FIG. 2.

Some of the content values in database table 141 are shown as hatched (i.e. gray) that, depending on the embodiment, each is implemented as a null value, an empty value, or a value that does not identify a member. As discussed earlier herein, different levels may have different counts of members. In an embodiment: a) each data row in database table 141 represents a distinct leaf member in dimension 121, and b) the count of data rows in database table 141 is the same as the count of leaf members in dimension 121.

In an embodiment, database table 141 consists of multiple database blocks, and each block contains, for example, one table row. In an embodiment, database table 141 saves time and space in computer 100 because storing or retrieving one table row (e.g. one database block) may transfer identifiers of many members in multiple levels in multiple summarization hierarchies. For example, database table 141 contains a row that represents month Jun (i.e. members 106A-B in FIG. 1A), and every column in that row contains a respective identifier of some member, including respective identifiers of members 106A, 151, and 153-155 from levels A1-A3 and B1-B2 in summarization hierarchies A-B. This colocation, in a same table row or database block, of identifiers from many levels and summarization hierarchies increases data locality of metadata for accelerated OLAP.

As shown in FIG. 1A, month member Jul 107A does not rollup into summarization hierarchy A as discussed earlier herein. Thus in FIG. 1B, levels A1-A2 are shown gray for month Jul. As shown in FIG. 1A, month members Jan 101 does not rollup in summarization hierarchy B. Thus in FIG. 1B, levels B1-B2 are shown gray for month Jan.

As shown in FIG. 1A, month Jun (i.e. members Jun 106A-B) rollup in both summarization hierarchies A-B. Thus in FIG. 1B, the whole row for month Jun is shown not gray.

1.10 Relational Database Techniques

Database table 141 is not a fact table. Although not shown, relational database 112 may contain a fact table that stores respective value(s) for each member identified in database table 141. Depending on the embodiment, such a fact table is: a) already preexisting and populated in relational database 112 or b) optionally generated during integration by computer 100 and populated with data retrieved from multidimensional database 111 as discussed elsewhere herein.

In the shown embodiment, database table 141 contains either or both of a join key column and a join num column. Either of these two join columns can be used as a join key for a relational join of a row of the fact table with a row of database table 141. For example, analytic view 131 may use a join column of database table 141 for a join with the fact table.

In an embodiment discussed later herein, analytic view 131 may be materialized and, in that case: a) rollup (e.g. summation) of values of leaf members 101-103 into member CalQtr1 152 may be precomputed (e.g. by multidimensional database 111 before or during the integration process of FIG. 2 or by the process of FIG. 2), and b) the fact table, for example, may store the precomputed value that is the result of the rollup. In that case, analytic view 131 may use either of name CalQtr1 from column name-A2 or ordinal integer 13 from column num-A2 as a foreign key to select the precomputed value that is the result of the rollup into member CalQtr1 152.

In an embodiment, relational database 112 is an Oracle autonomous data warehouse (ADW) database. Techniques for configuring and operating facts, measures, database tables, analytic views, relational databases, and ADWs are presented in U.S. Pat. No. 11,556,533 "Method For Generating Views Based On A Semantic Model, That Allows For Autonomous Performance Improvements And Complex Calculations" by James Hartsing et al on Nov. 12, 2020 that is incorporated herein in its entirety.

Techniques for analyzing members and dimensions in multidimensional database 111, techniques for generating levels and summarization hierarchies, and techniques for generating and populating a corresponding database table and analytic view in relational database 112 are as follows.

2.0 Example Database Integration Process

Figure 2:
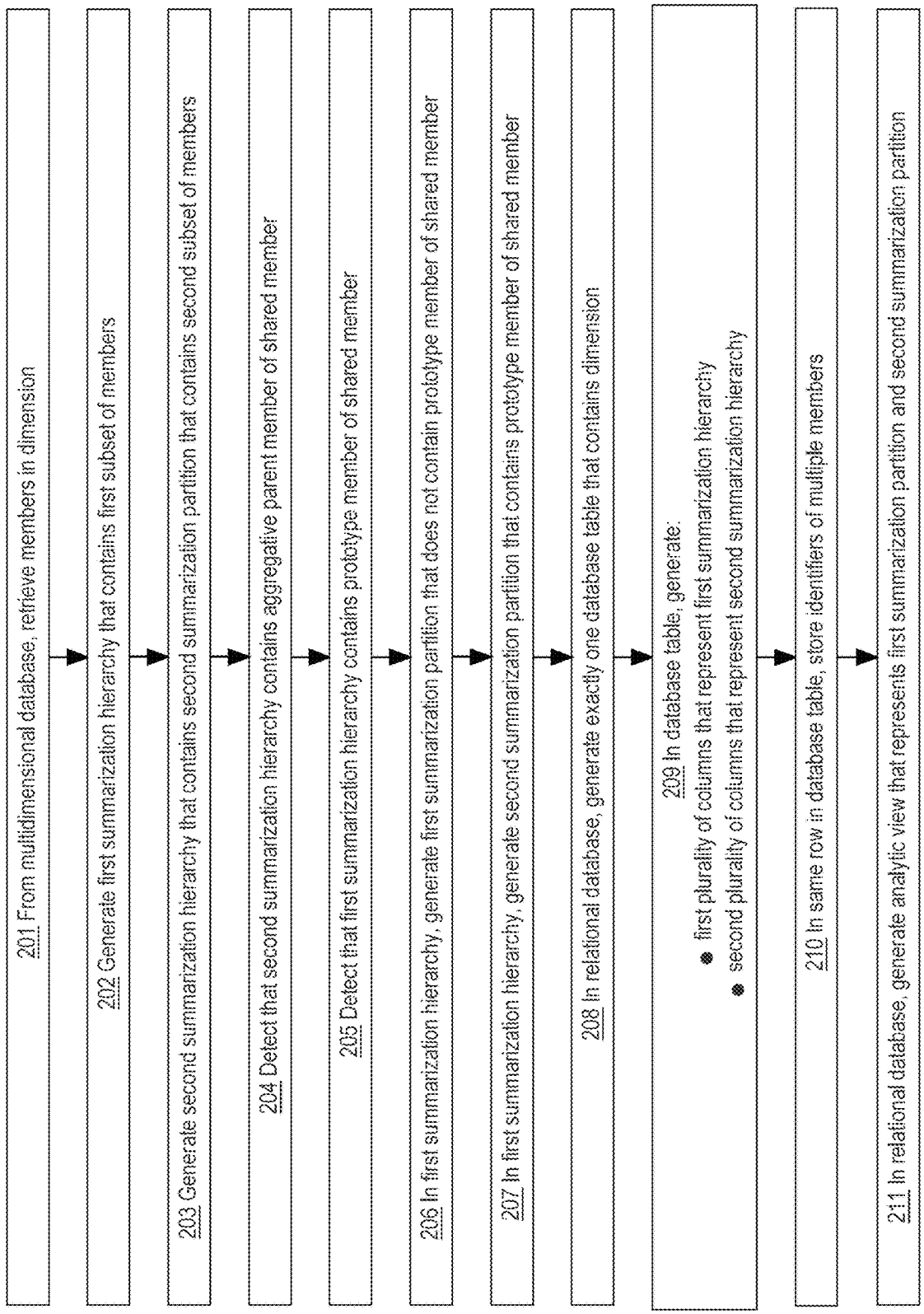
FIG. 2 is a dataflow diagram that depicts an example database integration process that a computer may perform to analyze members in a dimension in a multidimensional database and generate and populate a corresponding database table and an analytic view in a relational database.

FIG. 2 is a flow diagram that depicts an example database integration process that computer 100 may perform to infer and analyze members, levels, and summarization hierarchies A-B for dimension 121 in multidimensional database 111 and generate and populate corresponding database table 141 and analytic view 131 in relational database 112. As discussed earlier herein, integration and migration may be synonyms if migration does not require that content in multidimensional database 111 be deleted or become disused. The process of FIG. 2 may, for example, be repeated for an additional dimension.

For ease of demonstration, the process of FIG. 2 is presented as not being an extract, transform, and load (ETL) process. ETL would entail data from multidimensional database 111, but the process of FIG. 2 can be implemented, for example, instead based solely on metadata from multidimensional database 111. That is, all of the components in FIG. 1A that are members are metadata, not data, in multidimensional database 111. As discussed below, all of the components in FIG. 1A that are not members are not stored in multidimensional database 111. Thus herein, multidimensional database 111 may, for example, be used to provide only metadata. In that case, the integration approach herein is faster than any approach that requires retrieval of actual data from multidimensional database 111.

In an embodiment, computer 100 has respective database connections to databases 111-112, and these two connections are used respectively for extraction from multidimensional database 111 and loading into relational database 112. For example, retrieval of only metadata from multidimensional database 111 conserves network bandwidth. However, the process of FIG. 2 may optionally retrieve data from multidimensional database 111. For example, the process of FIG. 2 may optionally generate and populate a fact table in relational database 112 with data from multidimensional database 111. Fact tables are discussed elsewhere herein.

From dimension 121 in multidimensional database 111, step 201 retrieves distinct leaf and non-leaf members shown in FIG. 1A. In an embodiment, step 201 overlaps with other steps in FIG. 2. For example, the process of FIG. 2 may retrieve some members, process them, and then retrieve more members.

A C++ embodiment discussed later herein uses various iterators to perform various organizational activities such as: a) generating summarization partitions C-D that will be in summarization hierarchy A and b) merging summarization partitions D-E for later generation of analytic view 131. Partition creation and merging may occur in various iterations of iterators such that steps 202-203 may be interleaved or overlapped with steps 204-207. For example, partition creation and merging occur at various times during graph coloring in ways discussed later herein.

Steps 202-203 are shown above steps 204-207: a) to demonstrate that steps 202-203 may begin before steps 204-207 occur but b) that does not mean that steps 202-203 finish before steps 204-207 occur. In other words and as follows, steps 204-207 occur while generation of summarization hierarchies A-B still is incomplete. For example, generation of summarization hierarchy A may entail: a) detecting that a member such as month June rolls up in two summarization hierarchies A-B and b) deciding to generate two summarization partitions C-D.

Thus at various times, the process of FIG. 2 may: a) incrementally load additional members and add them to a growing summarization partition or b) generate additional summarization partition(s) . . . . Thus, a count of summarization partitions may gradually increase by operation of the process of FIG. 2.

Step 202 generates first summarization hierarchy A that contains a first subset of members, which are members 101-105, 106A, and 151-153. Step 203 generates second summarization hierarchy B that contains a second subset of members, which are members 154-155.

Step 204 detects that second summarization hierarchy B contains aggregative parent member FinQtr4 154 of shared members 106B, 107B, and 108B. Steps 204-205 together detect that summarization hierarchies A-B are in conflict. The relative ordering of detections steps 204-205 may be implementation or scenario dependent.

Step 205 detects that: a) first summarization hierarchy A contains prototype member Jun 106A of shared member Jun 106B and b) month Jun (i.e. members 106A-B) rolls up to multiple aggregative parent members 153-154.

In first summarization hierarchy A, step 206 generates first summarization partition D that does not contain prototype member Jun 106A of shared member Jun 106B. In first summarization hierarchy A, step 207 generates second summarization partition C that contains prototype member Jun 106A of shared member Jun 106B. That is, steps 206-207 assign members to two summarization partitions C-D based on detections by steps 204-205.

Steps 208-211 generate, based on detections by steps 204-206, database objects in relational database 112 for dimension 121 as follows. Step 208 generates exactly one database table 141 that contains the metadata of dimension 121 as discussed earlier herein and as follows. Steps 209-210 are sub-steps of step 208. In database table 141, step 209 generates both of: a) columns name-A1, name-A2, name-A3, num-A1, num-A2, and num-A3 that represent first summarization hierarchy A and b) columns name-B1, name-B2, num-B1, and num-B2 that represent second summarization hierarchy B.

In a same row in database table 141, step 210 stores identifiers of multiple members. For example as shown in FIG. 1B, database table 141 contains a row that represents month Jun (i.e. members 106A-B in FIG. 1A), and every column in that row contains a respective identifier of some member.

Step 211 generates, based on summarization partitions C-D, first analytic view 131 that: a) represents both of summarization hierarchies A-B in a way that avoids the conflict between summarization partitions C and E as discussed earlier herein and b) uses database table 141 as a base table as discussed earlier herein.

After the process of FIG. 2, databases 111-112 contain all of the components shown in FIG. 1B and, in some examples, a more or less similar OLAP query involving dimension 121 may be executed with either of databases 111-112 to retrieve similar results. The process of FIG. 2 may be repeated, for example, to resynchronize relational database 112 from multidimensional database 111. Depending on the embodiment, resynchronization may entail incrementally updating or entirely regenerating any of components 131 and 141 in relational database 112.

3.0 Example Graph Coloring for Conflict Detection and Resolution

The following example C++ pseudocode may be an embodiment of some of the steps of the process of FIG. 2. As discussed earlier herein, a summarization hierarchy or a summarization partition may be a logical tree, and the process of FIG. 2 may generate a directed acyclic graph (DAG). The following example C++ pseudocode is an algorithm that generates a DAG that contains many trees and performs analysis activities such as: a) generating two summarization partitions C-D that will be in summarization hierarchy A and b) merging two summarization partitions D-E for generating analytic view 131.

Each invocation of this algorithm may: a) process a respective distinct dimension and b) generate a respective distinct base table and distinct analytic view. In this algorithm, conflict detection may be an implementation of graph coloring such that conflicting summarization partitions are assigned distinct colors, and unconflicted summarization partitions may share a same color. Each invocation of this algorithm causes generation of a distinct analytic view in relational database 112.

In the following example C++ pseudocode: a) a color is referred to as a partition (i.e. summarization partition), b) each color has a unique zero-based integer serial number referred to as a partition index, which can be used as an index into an array or vector, c) partIndex1 and partIndex2 are variables that indicate same or different respective colors, d) p2h is a C++ standard template library (STL) std::vector, and e) partIndexSequence is an STL std::iterator. The worst-case time complexity of this algorithm is O(N*N*log (N)), where N is a count of members in the dimension. This time complexity is less than cubic, which is unprecedented for a given accuracy and reliability.

```
hierTrav.p2h.clear ( );
hierTrav.p2h.resize (hierTrav.partIndexMaxUsed, (HI-
    ERNUM)-1);
hierTrav.partIndexSequence.reset (hierTrav.partIndex-
    MaxUsed);
PartIndex partIndex1;
HIERNUM hierNumMaxUsed=0;
for (partIndex1=0; //start from the beginning
    partIndex1!=hierTrav.partIndexSequence.end ( );
    partIndex1=hierTrav.partIndexSequence.next
        (partIndex1)) //skip merged
{
    if (hierTrav.p2h[partIndex1] !=(HIERNUM)-1)
    {
    assert (false); //why not erased from hierTrav.partIn-
        dexSequence, and
    skipped by the call of next (partIndex1)?
    continue; //hierNum already set
    }
    hierTrav.p2h[partIndex1]=hierTrav.hierSeq.getHier-
        NumStart ( )+hierNumMaxUsed++;
    hierTrav.conflictSetTemp.clear ( );
    hierTrav.conflictSetSparseTemp.clear ( );
    //initializing the single merged set
    hierTrav.partIndexConflicts.insertConflictsOfTo-
        Temp (partIndex1,
    hierTrav.conflictSetTemp,
    hierTrav.conflictSetSparseTemp);
    PartIndex partIndex2;
```

```
for  (partIndex2=hierTrav.partIndexSequence.next
    (partIndex1); //start from the next to outer
partIndex2!=hierTrav.partIndexSequence.end ( );
partIndex2=hierTrav.partIndexSequence.next
    (partIndex2)) //skip merged
{
if (hierTrav.p2h[partIndex2] !=(HIERNUM)–1)
}
assert (false); //why not erased from hierTrav.partIn-
    dexSequence, and skipped by the call of next
    (partIndex2)
continue; //hierNum already set
}
const bool bHasConflict=
//checking with the single merged set
hierTrav.conflictSetTemp.contains (partIndex2)||
// . . . include the overflow part
(hierTrav.conflictSetSparseTemp.find   (partIndex2)
    !=
hierTrav.conflictSetSparseTemp.end ( ));
    if (bHasConflict)
    continue; //conflict, cannot merge
    hierTrav.p2h[partIndex2]=hierTrav.p2h[partIn-
        dex1]; //merge to same HIERNUM
    /* appending to the single merged set, not these of
        partIndex1 and of partIndex2,
    to keep the total set(s) size smaller
    */hierTrav.partIndexConflicts.insertConflictsOfTo-
        Temp (partIndex2,
    hierTrav.conflictSetTemp,
    hierTrav.conflictSetSparseTemp);
    //faster skip next time
    hierTrav.partIndexSequence.erase (partIndex2);
    //since we will skip it, we may clear it
    hierTrav.partIndexConflicts.clear (partIndex2);
    }
}//partIndex—dependent PartIndex conflicts
```

4.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
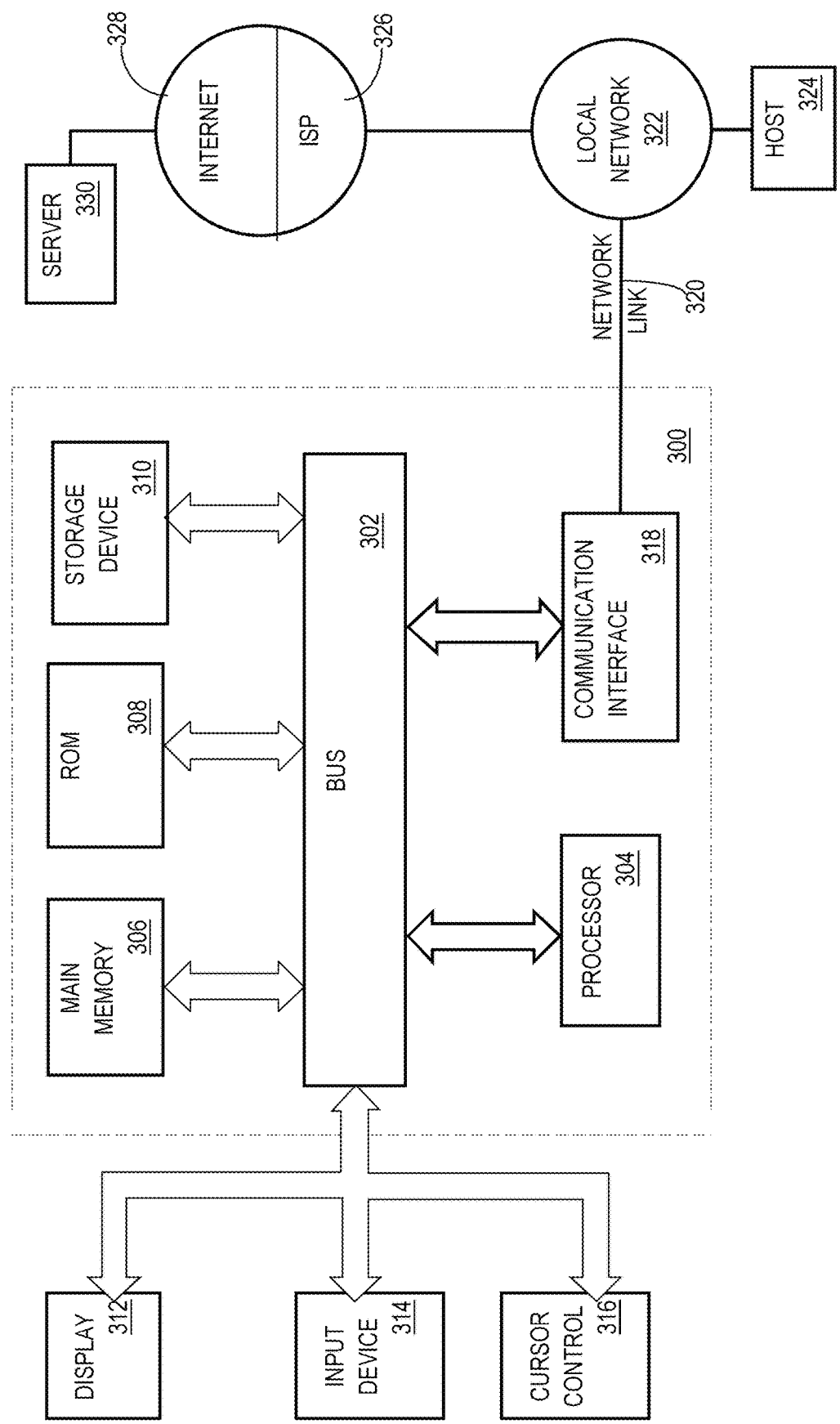
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
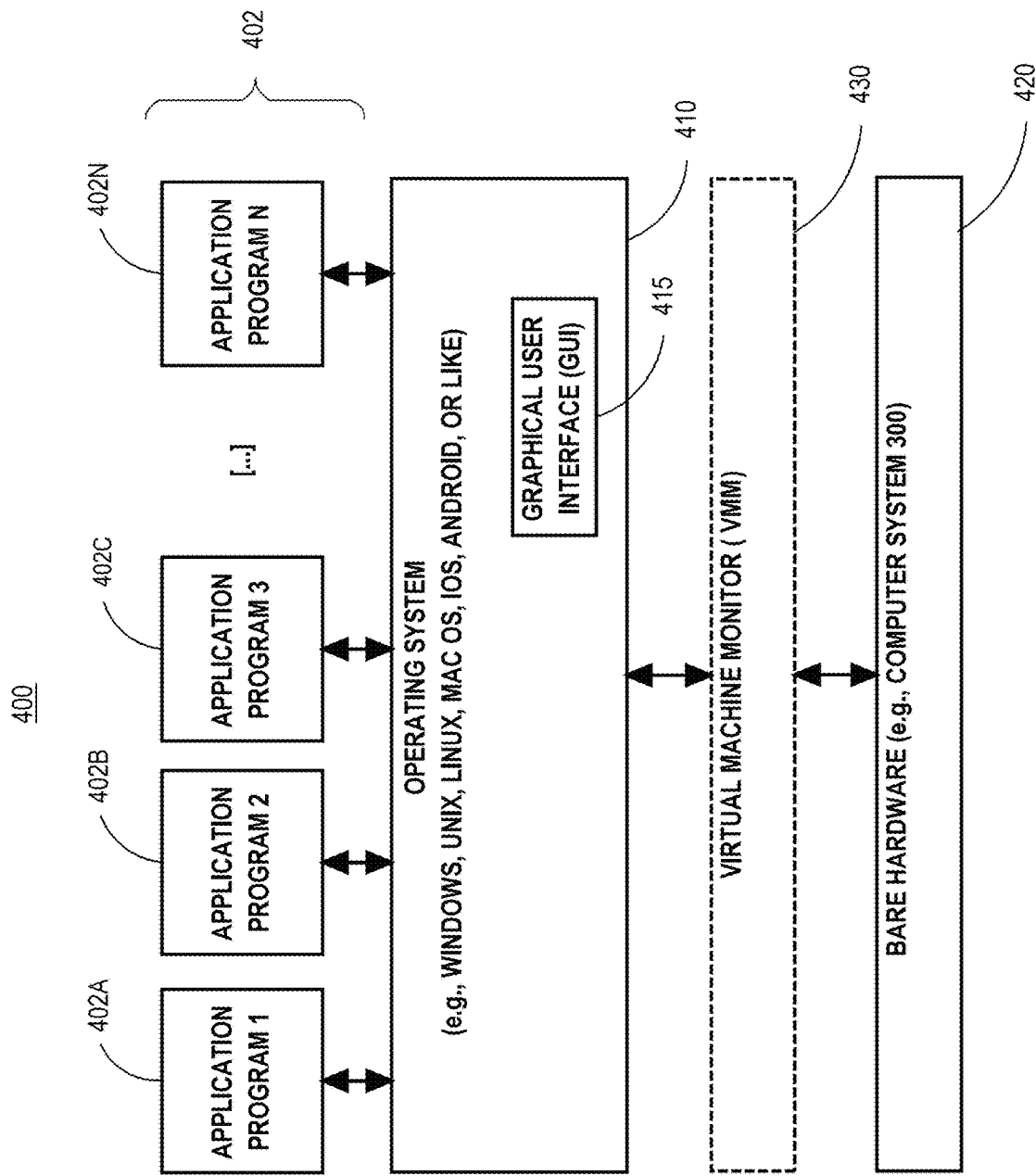
FIG. 4 is a block diagram that illustrates a basic software system that may be employed for controlling the operation of a computing system.

FIG. 4 is a block diagram of a basic software system 400 that may be employed for controlling the operation of computing system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 400 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
retrieving from a multidimensional database a plurality of members in a dimension;
generating a first summarization hierarchy that contains a first subset of the plurality of members;
generating a second summarization hierarchy that contains a second subset of the plurality of members;
detecting that the second summarization hierarchy contains an aggregative parent member of a shared member;
detecting that the first summarization hierarchy contains a prototype member of the shared member;
generating, based on said detecting that the second summarization hierarchy contains the aggregative parent member of the shared member and said detecting that the first summarization hierarchy contains the prototype member of the shared member, in the first summarization hierarchy:
a first summarization partition that does not contain the prototype member of the shared member and
a second summarization partition that contains the prototype member of the shared member; and
generating in a relational database, based on said generating the first summarization partition and the second summarization partition, an analytic view that represents the first summarization hierarchy and the second summarization hierarchy.

2. The method of claim 1 further comprising generating, in the relational database, exactly one database table that contains the dimension.

3. The method of claim 2 further comprising generating in the exactly one database table:
a first plurality of columns that represent the first summarization hierarchy and
a second plurality of columns that represent the second summarization hierarchy.

4. The method of claim 3 wherein the first plurality of columns contains at least one selected from a group consisting of a null value, an empty value, and a value that does not identify a member.

5. The method of claim 3 wherein:
the plurality of members contains a number of members;
the exactly one database table contains a number of rows that is less than the number of members.

6. The method of claim 3 wherein the first plurality of columns contains:
a first one or more columns that represent a first level in the first summarization hierarchy and
a second one or more columns that represent a second level in the first summarization hierarchy.

7. The method of claim 6 wherein the first one or more columns contains a first row that represents a first member and a second row that represents a second member.

8. The method of claim 6 wherein the first one or more columns contains:
a first column that contains a value that uniquely identifies a member in the exactly one database table and
a second column that contains a number that uniquely identifies the member in the exactly one database table.

9. The method of claim 1 wherein at least one condition selected from a group consisting of:
a third summarization partition contains fewer levels than the first summarization partition and the first summarization partition contains an aggregative parent member of a member in a third summarization partition.

10. The method of claim 1 further comprising storing, in a single row of a database table in the relational database, respective identifiers of two members selected from a group consisting of:
a) two members in distinct respective levels in the first summarization hierarchy and
b) a member in the first summarization partition and a member in the second summarization partition.

11. One or more non-transitory computer-readable media storing instructions that, when executed by one or more processors, cause:
retrieving from a multidimensional database a plurality of members in a dimension;
generating a first summarization hierarchy that contains a first subset of the plurality of members;
generating a second summarization hierarchy that contains a second subset of the plurality of members;
detecting that the second summarization hierarchy contains an aggregative parent member of a shared member;
detecting that the first summarization hierarchy contains a prototype member of the shared member;
generating, based on said detecting that the second summarization hierarchy contains the aggregative parent member of the shared member and said detecting that the first summarization hierarchy contains the prototype member of the shared member, in the first summarization hierarchy:
a first summarization partition that does not contain the prototype member of the shared member and
a second summarization partition that contains the prototype member of the shared member; and
generating in a relational database, based on said generating the first summarization partition and the second summarization partition, an analytic view that represents the first summarization hierarchy and the second summarization hierarchy.

12. The one or more non-transitory computer-readable media of claim 11 wherein the instructions further cause generating, in the relational database, exactly one database table that contains the dimension.

13. The one or more non-transitory computer-readable media of claim 12 wherein the instructions further cause generating in the exactly one database table:
a first plurality of columns that represent the first summarization hierarchy and a second plurality of columns that represent the second summarization hierarchy.

14. The one or more non-transitory computer-readable media of claim 13 wherein the first plurality of columns contains at least one selected from a group consisting of a null value, an empty value, and a value that does not identify a member.

15. The one or more non-transitory computer-readable media of claim 13 wherein:
the plurality of members contains a number of members;
the exactly one database table contains a number of rows that is less than the number of members.

16. The one or more non-transitory computer-readable media of claim 13 wherein the first plurality of columns contains:
a first one or more columns that represent a first level in the first summarization hierarchy and
a second one or more columns that represent a second level in the first summarization hierarchy.

17. The one or more non-transitory computer-readable media of claim 16 wherein the first one or more columns contains a first row that represents a first member and a second row that represents a second member.

18. The one or more non-transitory computer-readable media of claim 16 wherein the first one or more columns contains:
- a first column that contains a value that uniquely identifies a member in the exactly one database table and
- a second column that contains a number that uniquely identifies the member in the exactly one database table.

19. The one or more non-transitory computer-readable media of claim 11 wherein at least one condition selected from a group consisting of:
- a third summarization partition contains fewer levels than the first summarization partition and
- the first summarization partition contains an aggregative parent member of a member in a third summarization partition.

20. The one or more non-transitory computer-readable media of claim 11 wherein the instructions further cause storing, in a single row of a database table in the relational database, respective identifiers of two members selected from a group consisting of:
- a) two members in distinct respective levels in the first summarization hierarchy and
- b) a member in the first summarization partition and a member in the second summarization partition.

* * * * *